United States Patent
Chakroun

(10) Patent No.: US 12,084,377 B2
(45) Date of Patent: Sep. 10, 2024

(54) MINERAL FIBER FORMING DEVICE

(71) Applicant: SAINT-GOBAIN ISOVER, Courbevoie (FR)

(72) Inventor: Mohamed Chakroun, Paris (FR)

(73) Assignee: SAINT-GOBAIN ISOVER, Courbevoie (FR)

(*) Notice: Subject to any disclaimer, the term of this patent is extended or adjusted under 35 U.S.C. 154(b) by 151 days.

(21) Appl. No.: 17/385,517

(22) Filed: Jul. 26, 2021

(65) Prior Publication Data

US 2021/0355019 A1  Nov. 18, 2021

Related U.S. Application Data

(60) Division of application No. 16/166,774, filed on Oct. 22, 2018, now Pat. No. 11,117,827, which is a continuation of application No. 14/415,368, filed as application No. PCT/FR2013/051687 on Jul. 15, 2013, now Pat. No. 10,138,156.

(30) Foreign Application Priority Data

Jul. 16, 2012  (FR) ..................... 1256851

(51) Int. Cl.
C03B 37/04  (2006.01)
(52) U.S. Cl.
CPC ............ *C03B 37/04* (2013.01); *C03B 37/048* (2013.01); *Y02P 40/57* (2015.11)
(58) Field of Classification Search
None
See application file for complete search history.

(56) References Cited

U.S. PATENT DOCUMENTS

| | | | |
|---|---|---|---|
| 2,949,632 A | 8/1960 | Dale | |
| 3,040,377 A * | 6/1962 | Slayter | .......... C03B 37/045 65/461 |
| 3,233,989 A | 2/1966 | Stalego | |
| 3,250,602 A | 5/1966 | Stalego | |
| 3,304,164 A | 2/1967 | Brossard | |
| 3,644,108 A | 2/1972 | Russell | |
| 4,359,444 A | 11/1982 | Shah et al. | |

(Continued)

FOREIGN PATENT DOCUMENTS

| | | |
|---|---|---|
| EP | 0 189 354 B1 | 4/1992 |
| EP | 0 519 797 A1 | 12/1992 |

(Continued)

OTHER PUBLICATIONS

International Search Report as issued in International Patent Application No. PCT/FR2013/051687, dated Oct. 18, 2013.

*Primary Examiner* — Queenie S Dehghan
(74) *Attorney, Agent, or Firm* — Pillsbury Winthrop Shaw Pittman LLP

(57) ABSTRACT

A mineral fiber forming device including: a centrifuge configured to rotate about a rotation axis, the centrifuge including an annular wall pierced by a plurality of orifices, the axis of symmetry of the annular wall being the rotation axis; a first annular inductor configured to heat a top part of the annular wall; a second annular inductor configured to heat a bottom part of the annular wall. The device makes it possible to increase its energy efficiency and very greatly reduce, even cancel altogether, its carbon dioxide emission level.

11 Claims, 1 Drawing Sheet

(56) References Cited

U.S. PATENT DOCUMENTS

| | | |
|---|---|---|
| 4,534,779 A | 8/1985 | Herschler |
| 4,631,381 A | 12/1986 | Delage |
| 4,661,135 A | 4/1987 | Mosnier |
| 5,314,521 A | 5/1994 | Lewis |
| 5,601,628 A | 2/1997 | Battigelli |
| 5,688,302 A | 11/1997 | Snyder |
| 5,900,037 A | 5/1999 | Yang et al. |
| 2007/0261447 A1 * | 11/2007 | Borsa ..................... C03B 37/04 65/460 |

FOREIGN PATENT DOCUMENTS

| | | |
|---|---|---|
| EP | 1 370 496 A1 | 12/2003 |
| FR | 1 382 917 A1 | 12/1964 |
| FR | 2 443 436 A1 | 7/1980 |
| GB | 849 981 A | 9/1960 |
| WO | WO 97/15532 A1 | 5/1997 |
| WO | WO 02/070417 A1 | 9/2002 |
| WO | WO 03/069226 A1 | 8/2003 |

\* cited by examiner

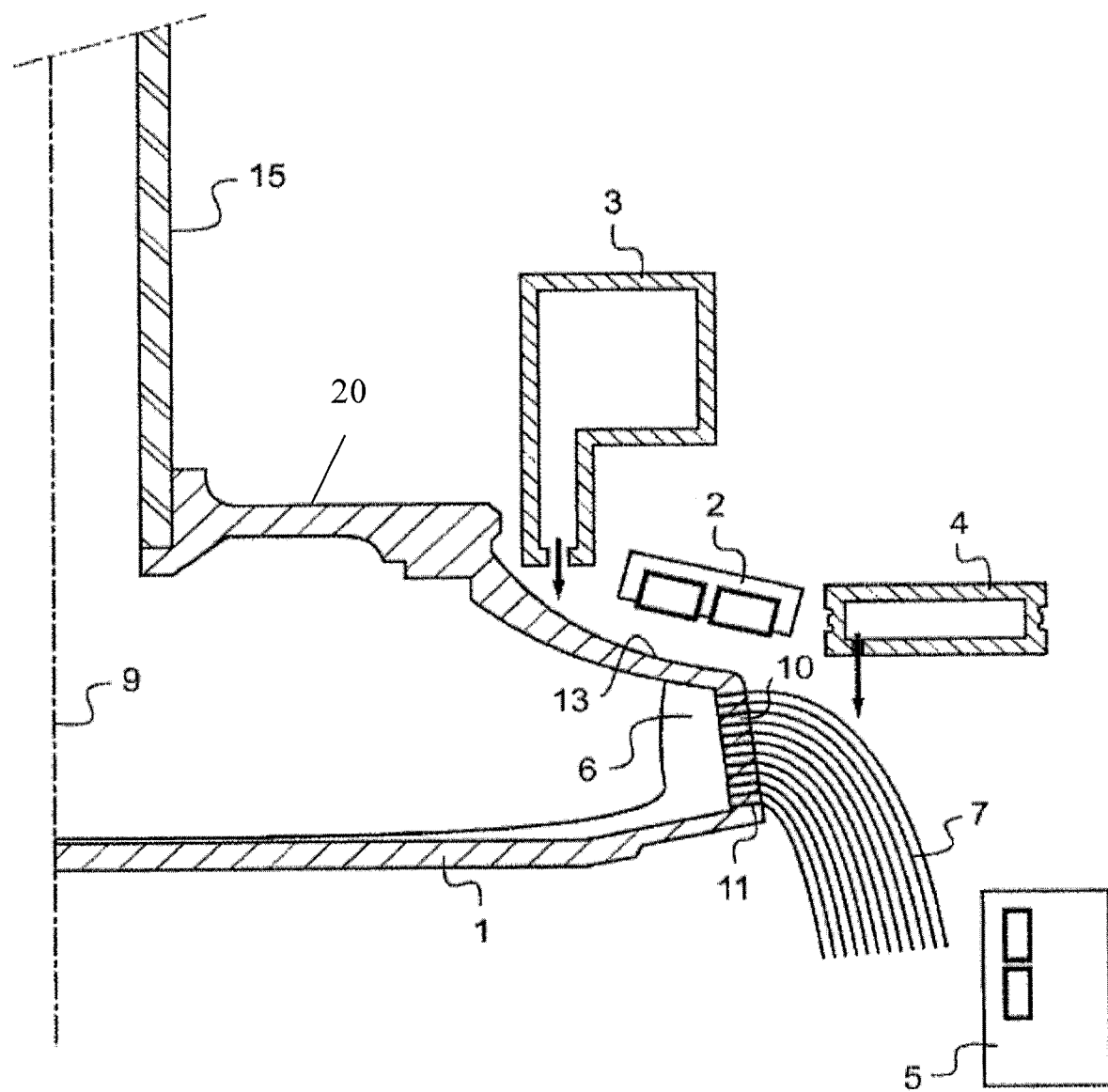

MINERAL FIBER FORMING DEVICE

CROSS-REFERENCE TO RELATED APPLICATIONS

This application is a divisional of U.S. application Ser. No. 16/166,774, filed Oct. 22, 2018, which is a continuation of U.S. application Ser. No. 14/415,368, filed on Jan. 16, 2015, now U.S. Pat. No. 10,138,156, which is the U.S. National Stage of PCT/FR2013/051687, filed on Jul. 15, 2013, which in turn claims priority to French patent application number 1256851 filed Jul. 16, 2012. The content of these applications are incorporated herein by reference in their entireties.

BACKGROUND

The invention relates to a device for forming mineral fibers by an internal centrifuging method. It applies in particular to the industrial production of glass wool that is intended to be used, for example, in the composition of thermal and/or acoustic insulation products.

Different internal centrifuging methods are known. A molten glass thread is introduced into a fiberizing spinner rotating at high speed and pierced at its periphery by a very great number of orifices through which the glass is sprayed in the form of filaments under the effect of the centrifugal force. These filaments can then be subjected to the action of an annular drawing current at high temperature and speed along the wall of the centrifuge, a current that thins them and transforms them into fibers. The fibers that are formed are driven by this gaseous drawing current to a receiving device generally consisting of a gas-permeable receiving and conveying mat.

This method has been the subject of numerous refinements, relating in particular, for some, to the fiberizing spinner, for others, to the means of generating the annular drawing current, for example by the use of burners of particular type. See in particular the documents EP-B-0 189 354, EP-B-0 519 797, WO-A-97/15532 regarding the latter point.

The document FR-A-1 382 917 describes a fiberizing member, the principle of which is still abundantly used: the molten material is brought into a basket comprising, on its vertical wall, orifices through which the material is sprayed onto the wall of a fiberizing spinner which is attached to the basket and which comprises a large number of orifices. This wall is called the "strip" of the fiberizing spinner. In order to obtain quality fiber production, the orifices are distributed on annular rows and the diameters of the orifices are variable depending on the row to which they belong, this diameter decreasing from the top of the strip to its bottom part.

Enhancements have been made to this basic principle, as taught in particular in the document FR-A-2 443 436, in which means make it possible to obtain a laminar flow of the molten material from top to bottom of the strip of the spinner.

Another modification, described in the document EP-A-1 370 496, has been made to enhance the quality of the fibers and increase the efficiency. This modification entails distributing the orifices of the strip in a plurality of annular areas arranged one above the other, with at least two annular areas having a number of orifices per unit of surface area which is different by a value greater than or equal to 5%.

The document WO 03/069226 describes an internal combustion burner comprising a combustion chamber into which opens at least one fuel and oxidant feed duct and at least one flame stabilizing element creating a containment area in which at least a portion of the combustion takes place.

In all these examples, the peripheral strip of the spinner is heated both by the molten glass which is centrifuged in the fiberizing spinner and by the hot air blown by an internal combustion burner generating the annular drawing current.

However, the heating by an internal combustion burner is a source of significant energy consumption, with an energy efficiency less than 30%, and a source of very high carbon dioxide emissions.

BRIEF SUMMARY

There is therefore a need for a mineral fiber forming device which has an energy consumption and a carbon dioxide emission level that are both reduced.

For this, the invention proposes a mineral fiber forming device comprising:
- a centrifuge suitable for rotating about a rotation axis, the centrifuge comprising an annular wall pierced by a plurality of orifices, the axis of symmetry of the annular wall being the rotation axis,
- a first annular inductor suitable for heating the top part of the annular wall,
- a second annular inductor suitable for heating the bottom part of the annular wall.

According to another particular feature, the mineral fiber forming device also comprises a first blowing ring suitable for blowing air over the mineral fibers that are about to leave through the plurality of orifices in the annular wall so as to drive them to a fiber receiving and conveying mat.

According to another particular feature, the mineral fiber forming device also comprises a second blowing ring suitable for blowing air over an area of the centrifuge situated above the annular wall so as to control the temperature of the top part of the centrifuge.

According to another particular feature, the cooperation of the two blowing rings creates an area of turbulences in proximity to the annular wall of the centrifuge, this area of turbulences allowing for an additional drawing of the mineral fibers that are about to leave through the plurality of orifices in the annular wall.

According to another particular feature, the device also comprises at least two first concentric blowing rings of different diameters, the cooperation of the first blowing rings creating an area of turbulences in proximity to the annular wall of the centrifuge, this area of turbulences allowing for an additional drawing of the mineral fibers that are about to leave through the plurality of orifices in the annular wall.

According to another particular feature, the first annular ring comprises a plurality of concentric air outlets creating an area of turbulences in proximity to the annular wall of the centrifuge, this area of turbulences allowing for an additional drawing of the mineral fibers that are about to leave through the plurality of orifices in the annular wall.

According to another particular feature, the second annular inductor, for example situated under the centrifuge, is connected in series or in parallel with the first annular inductor. The first and second inductors are then preferably powered independently of one another.

According to another particular feature, the mineral fiber forming device also comprises an internal burner suitable for use on starting up the mineral fiber forming device.

According to another particular feature, the centrifuge comprises a bottom.

According to another particular feature, the centrifuge does not comprise a bottom and comprises a basket.

According to another particular feature, the mineral fiber forming device also comprises a mineral fiber gluing ring situated under the centrifuge.

The invention also relates to a method for forming mineral fibers by internal centrifuging, implementing the device described above, in which the material to be turned into fiber is poured into the centrifuge.

BRIEF DESCRIPTION OF THE DRAWING

Other features and advantages of the invention will now be described in light of the drawings in which:

FIG. 1 represents a cross-sectional view of a mineral fiber forming device according to the invention.

DETAILED DESCRIPTION

"Up", "down", "above" and "under" are defined in relation to a vertical axis when the centrifuge is in the centrifuging position, that is to say when the rotation axis of the centrifuge is on a vertical axis, as in FIG. 1.

The invention relates to a mineral fiber forming device. The device comprises a centrifuge suitable for rotating about a rotation axis. The centrifuge comprises an annular wall, whose axis of symmetry is the rotation axis, which is pierced by a plurality of orifices. The device also comprises first and second annular inductors. The first annular inductor is suitable for heating the top part of the annular wall of the centrifuge. The second annular inductor is suitable for heating the bottom part of the annular wall of the centrifuge.

Thus, the heating of the centrifuge is carried out by electrical induction, which makes it possible to increase the energy efficiency and very greatly reduce, even cancel out altogether (if no internal burner is used), the carbon dioxide emission level, since no annular internal combustion burner producing a flow of hot gas is used.

FIG. 1 represents a cross-sectional view of a mineral fiber forming device according to the invention.

The mineral fiber device comprises a centrifuge 1, also called fiberizing spinner, comprising an annular wall pierced by a plurality of orifices 11. The centrifuge 1 also comprises a web 13. The web 13 forms the top of the centrifuge 1, between the annular wall and the tulip 20. The mineral fiber forming device also comprises a shaft 15 of axis 9 intended to be driven in rotation by a motor (not represented). The centrifuge 1 is fastened to the shaft 15 via the tulip 20, which is in the extension of the web. When the mineral fiber forming device is in the fiberizing position, the axis 9 is vertical. The axis 9 is the axis of symmetry of the centrifuge.

The shaft 15 is hollow. At its top end, the shaft 15 is linked to molten glass feeding means. At its bottom end, the shaft 15 is linked to the centrifuge when the latter is provided with a bottom, as can be seen in FIG. 1. As a variant, if the centrifuge 1 does not have a bottom, the shaft 15 is linked to a basket. In the case of a device with basket, the basket is situated inside the centrifuge 1, which is itself fastened to the shaft 15. The basket, also fastened to the shaft 15, is intended to be driven in rotation with the centrifuge 1 and the shaft 15. The basket comprises an annular wall pierced by a plurality of orifices.

When the mineral fiber forming device is in operation, the centrifuge 1 and the shaft 15, as well as, if appropriate, the basket, are driven in rotation about the axis 9 of the shaft 15. Molten glass 6 flows into the shaft 15, from the molten glass feeding means, to the bottom of the spinner or into the basket, wherein the molten glass 6 spreads. In the case of a centrifuge with bottom, a permanent reserve of molten glass 6 is formed against the annular wall 10 under the effect of the rotation. In the case of a centrifuge without bottom and with basket, the molten glass is sprayed, under the effect of the rotation, onto the annular wall of the basket, passes through the plurality of orifices in the basket and, in the form of bulky filaments, is sprayed onto the peripheral wall 10 of the centrifuge 1. A permanent reserve of molten glass 6 is then formed in the centrifuge without bottom against the annular wall under the effect of the rotation. The permanent reserve of molten glass 6 feeds the plurality of orifices 11 pierced in the annular wall 10 of the centrifuge 1 to form flow cones that extend to become pre-fibers.

The orifices 11 in the annular wall 10 of the centrifuge 1 are preferably more numerous and of smaller diameter than the orifices of an annular wall of a centrifuge used with an internal combustion burner because the drawing is less effective with induction heating than with heating by internal combustion burner. Thus, the annular wall 10 of the centrifuge 1 preferably comprises between 5000 and 25 000 orifices and the orifices 11 preferably have a diameter of between 0.2 mm and 0.5 mm for a spinner diameter of 200 mm.

The mineral fiber forming device also comprises a first annular inductor 2 suitable for heating the top part of the annular wall 10 of the centrifuge 1. The first annular inductor 2 can also be suitable for also heating the web 13 of the centrifuge 1. The first annular inductor 2 is, for example, arranged above the centrifuge 1, in proximity to the web 13 and the annular wall 10. The first annular inductor 2 consists, for example, of coils comprising between one and four copper turns, for example between two and four copper turns. The annular inductor 2 is preferably provided with field concentrators, for example made of ferrite, which make it possible to direct the magnetic field toward the spinner in order to heat only the spinner and, thus, protect the other metal parts of the device. The annular inductor 2 makes it possible to heat the annular wall to a temperature of between 1000 and 1200° C.

The mineral fiber forming device also comprises a second annular inductor 5 suitable for heating the bottom part of the annular wall 10 of the centrifuge 1. The second annular inductor can also be suitable for also heating the area of the centrifuge situated below the annular wall 10. The second annular inductor 5 is, for example, situated under the centrifuge. The second annular inductor 5 consists, for example, of coils comprising between one and four copper turns, for example between two and four copper turns. The annular inductor 5 is preferably provided with field concentrators, for example made of ferrite, which make it possible to direct the magnetic field toward the spinner in order to heat only the spinner and, thus, protect the other metal parts of the device. The assembly of the two annular inductors 2 and 5 has, for example, a power of 20 to 150 kW, for example 20 to 70 kW.

The operating frequency of the first and second annular inductors 2, 5 is, for example, between 1 and 300 kH.

The second annular inductor 5 is, for example, connected with the first annular inductor 2, in series or in parallel, so that the magnetic fields of the first and second annular inductors 2, 5 are in phase to avoid the mutual effects or the phase-shifted fields which cancel one another out.

As a variant, the first and second annular inductors 2, 5 are powered by two independent circuits, preferably powered independently in order to be able to control and regulate their power independently. The generators are such that the effects of mutuality have to be avoided or, at least, limited.

The heating of the annular strip by two different areas (top and bottom) makes it possible to have a temperature gradient over the height of the centrifuge 1. This makes it possible to control the viscosity of the glass over the height of the annular strip and, thus, manufacture mineral fibers that have more uniform dimensions and properties. When the first and second annular inductors 2, 5 are in series or in parallel, the heating temperature difference between the top area and the bottom area of the annular strip is set by acting, for example, on the position, the number and the diameter of the turns of each annular inductor. When the first and second annular inductors 2, 5 are powered independently, the setting of the temperature on the two areas of the annular strip is facilitated because the power can be set independently for each annular inductor.

The top part of the annular strip heated by the first annular inductor 2 and the bottom part of the annular strip heated by the second annular inductor 5 can have an area of partial overlap. The area of overlap cannot be total, otherwise the possibility of having a temperature gradient would disappear.

The mineral fiber forming device also comprises a blowing ring 4, arranged above the centrifuge 1, and suitable for blowing air on the fibers leaving the centrifuge, preferably vertically and downward, so as to turn them down toward a receiving mat situated under the fiberizing device. The blowing ring 4 can blow air with an angle of at most 25° relative to the vertical, toward the annular wall 10. The pressure of the blowing flow at the output of the blowing ring 4 is preferably between 1 and 2 bar.

The mineral fiber forming device may also comprise a second blowing ring 3, arranged above the centrifuge 1, in proximity to the web 13. The second blowing ring 3 is suitable for blowing air toward the web 13, preferably vertically and downward. The pressure of the blowing flow at the output of the blowing ring 3 is preferably between 0.5 and 2 bar.

When the second blowing ring 3 is present, the jets of air blown by the two blowing rings 3, 4 meet and create, at their intersection, an area of turbulences. This area of turbulences is situated in proximity to the annular wall 10. The turbulences produced make it possible to draw even further the mineral fibers than with only the centrifugal force.

As a variant, the blowing ring 4 may comprise a plurality of concentric air outlets but more or less distant from the axis 9. Or else, the mineral fiber forming device may comprise a plurality of first blowing rings 4 arranged one above the other, with diameters slightly different to one another. These variants make it possible to have a plurality of concentric air jets which create an area of turbulences favoring an enhanced drawing of the fibers.

These different variants can be combined with one another.

Optionally, the mineral fiber forming device may also comprise an internal burner (not represented). The internal burner makes it possible to heat the centrifuge 1 on starting up the mineral fiber forming method so that the molten glass arrives in a centrifuge 1 which is not cold to avoid the crystallization of the glass. The internal burner is preferably used only on startup so as to avoid any significant production of carbon dioxide. The gas flow rate of the internal burner is less than 5, for example less than 3 $Nm^3/h$.

Preferably, the centrifuge 1 is heated only by the two annular inductors 2, 5 without using an internal burner. Thus, the level of carbon dioxide emitted by the mineral fiber forming device can be zero.

Furthermore, the mineral fiber forming device has an efficiency which can be as high as 75% or more, instead of only 30% with an internal combustion burner, and this for comparable operating temperatures. The mineral fiber forming device according to the invention thus allows for an energy saving.

The mineral fiber forming device also comprises, preferably, a mineral fiber gluing ring (not represented), situated under the centrifuge.

According to a variant which is not represented, the mineral fiber forming device comprises a centrifuge that is open on the top, without web or tulip, with only an annular wall sealed at the bottom by a bottom. The bottom is fastened to the bottom end of a solid shaft. The centrifuge is driven in rotation about its axis of symmetry by the rotation of the hollow shaft about the axis of symmetry of the hollow shaft. The molten glass is brought into the spinner via a pipe that is offset relative to the axis of symmetry of the centrifuge. The pipe feeding the molten glass does not rotate with the hollow shaft and the centrifuge. The annular inductor 2 is arranged above the annular wall 10, so as to heat at least the top part of the annular wall 10. The device comprises a single blowing ring 4, arranged above the centrifuge 1, so as to blow air on the fibers leaving the centrifuge, preferably vertically, so as to turn them down toward a receiving mat situated under the fiberizing device. The rest is identical to the embodiment described according to FIG. 1.

The invention also relates to a method for forming mineral fibers by internal centrifuging. This method implements the device according to the invention, where the material to be turned into fiber is poured into the centrifuge 1. The use of the centrifuge according to the invention thus makes it possible to improve the energy efficiency of the method and to reduce, even cancel out altogether, the production of carbon dioxide.

The mineral fibers obtained by the mineral fiber forming device according to the invention are used to manufacture thermal and/or acoustic insulation products.

The invention claimed is:

1. A mineral fiber forming device for producing an insulating product comprising:
    a molten glass feeding system configured to supply molten glass;
    a hollow shaft having a top end coupled to the molten glass feeding system so as to receive the molten glass,
    a centrifuge coupled to a bottom end of the hollow shaft so that the molten glass flows into the hollow shaft until the molten glass arrives into the centrifuge when the device is in operation, the hollow shaft having a same axis of symmetry as the centrifuge, the centrifuge being configured to rotate about a rotation axis, the centrifuge comprising an annular wall pierced by a plurality of orifices, an axis of symmetry of the annular wall being the rotation axis, and the annular wall having a height,
    a first annular inductor positioned above the annular wall and configured to heat a top area of the annular wall to generate a first heating zone on said annular wall,
    a second annular inductor comprising one or more coils, the second annular inductor positioned below a bottom of the annular wall such that each of the one or more coils is positioned below the annular wall pierced by a plurality of orifices and such that the second annular inductor is configured to heat a bottom area of the annular wall to generate a second heating zone on said annular wall, one or more power generators adapted to power said first and second annular inductors so that said first heating zone and said second heating zone only partially overlap on said annular wall to generate a gradient of temperatures along the height of said annular wall;

a conveyor configured to receive and convey mineral fibers, a first blowing ring configured to blow air on the mineral fibers that are about to leave through the plurality of orifices in the annular wall so as to drive them to the conveyor, wherein the mineral fiber forming device is devoid of any burner located externally to said centrifuge.

2. The mineral fiber forming device of claim 1, wherein the first and second annular inductors are arranged in series and powered by a same power generator.

3. The mineral fiber forming device of claim 2, wherein the gradient of temperatures is generated based on a position, a number and a diameter of turns of each of the first and second annular inductors.

4. The mineral fiber forming device of claim 1, wherein the first and second annular inductors are arranged in parallel and powered by two independent power generators, said two independent power generators adapted to supply power independently to said first and second annular inductors to generate the gradient of temperatures.

5. The mineral fiber forming device of claim 1, wherein the gradient of temperatures is generated to control a viscosity of the glass along the height of the annular wall and generate glass fibers that have uniform dimensions and properties.

6. The mineral fiber forming device of claim 1, wherein the first and second annular inductors each include a field concentrator to direct a respective electromagnetic field generated by the first and second annular inductors towards said centrifuge to generate said first and second heating zones.

7. The mineral fiber forming device of claim 1, further comprising a second blowing ring configured to blow air, the cooperation of the first and second blowing rings creating an area of turbulences in proximity to the annular wall of the centrifuge, said area of turbulences allowing for an additional drawing of the mineral fibers that are about to leave through the plurality of orifices in the annular wall.

8. The mineral fiber forming device of claim 1, further comprising an internal burner that is adapted for use on starting up the mineral fiber forming device.

9. The mineral fiber forming device of claim 1, wherein a position, a number and a diameter of turns of each of the first and second annular inductors are set to achieve said only partial overlap of said first heating zone and said second heating zone on said annular wall during drawing of the mineral fibers through the plurality of orifices.

10. The mineral fiber forming device of claim 1, wherein the centrifuge includes a solid bottom that extends from the annular axis of the centrifuge to the annular wall so as to close a lower part of the centrifuge and receive the molten glass from the hollow shaft.

11. The mineral fiber forming device of claim 10, wherein the second inductor is positioned to heat the solid bottom of the centrifuge.

* * * * *